March 29, 1938.  N. C. PRICE  2,112,750
CONTROL
Filed April 10, 1935  4 Sheets-Sheet 1
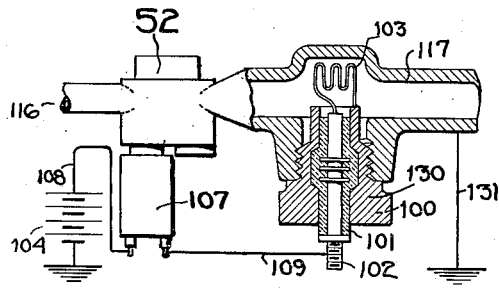
FIG_1_
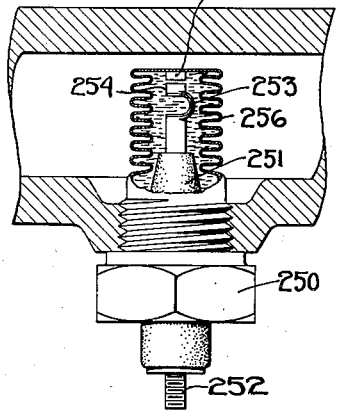
FIG_5_
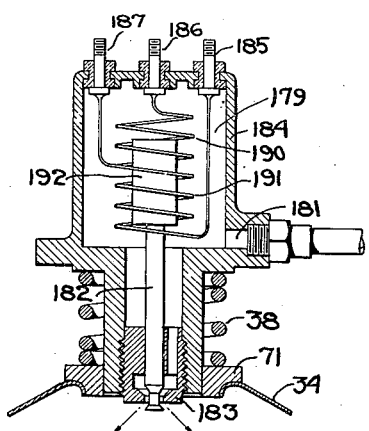
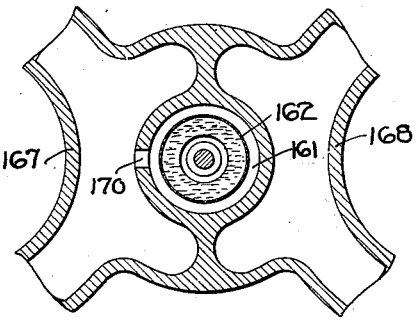
FIG_9_
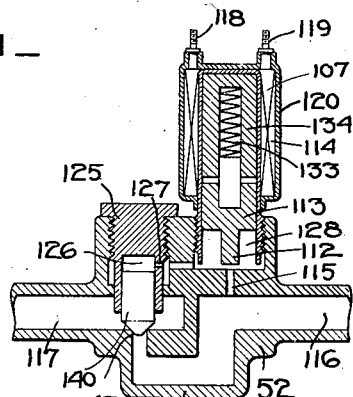
FIG_13_
FIG_10_
FIG_12_
INVENTOR.
Nathan C. Price.

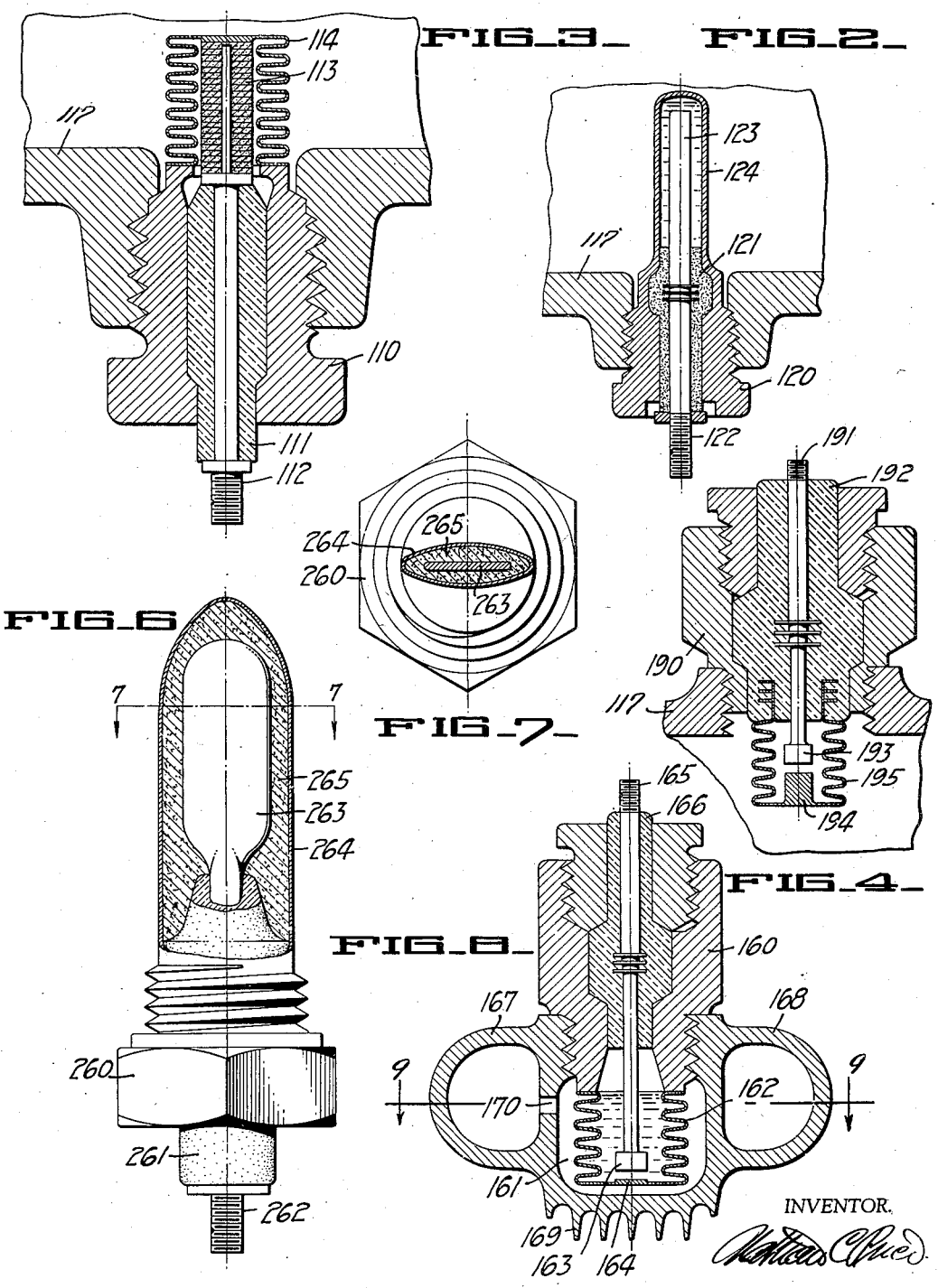

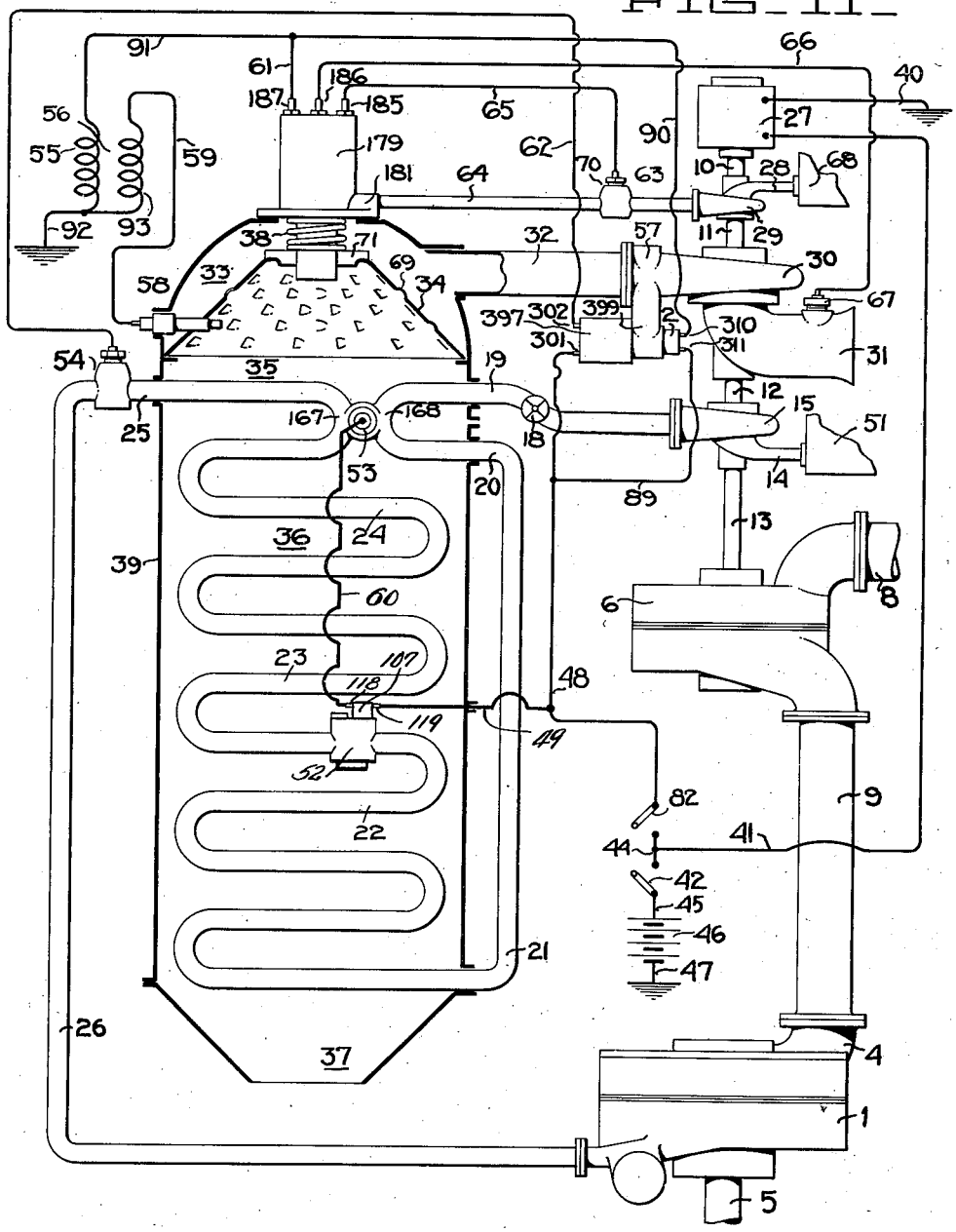

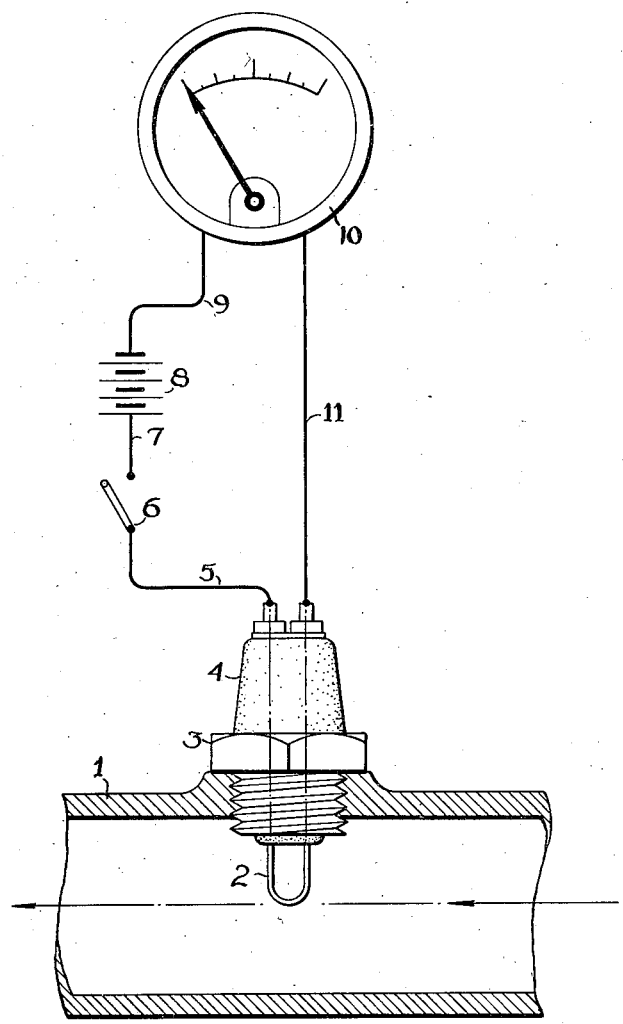

Patented Mar. 29, 1938

2,112,750

UNITED STATES PATENT OFFICE 2,112,750

CONTROL

Nathan C. Price, Berkeley, Calif.

Application April 10, 1935, Serial No. 15,530

17 Claims. (Cl. 122—448)

My invention relates to a new method of controlling the flow of fluids through conduits or tubes. It is of especial value in the regulation of the flow of feed liquid to forced circulation or series tube boilers in order at all times to maintain the boiler fluid conditions from the feed inlet to the discharge outlet at the most advantageous state, pressure, and temperature. It also serves to prevent disturbing uncontrolled cycles of pressure and temperature fluctuation in the fluid at the boiler outlet.

My invention is of further particular value for controlling the flow of thermally related fluids in heat exchangers and condensers to effect desired regulation of the heat transfer and physical state of the fluids therein.

Generally, my invention provides a new method of regulating the flow of fluids through conduits in relation to certain qualities of the fluids at one or more points. It is of value in correlating the flow and thermal conditions of fluids in separate conduits, as well.

In order to accomplish this new method of control, the system of my invention is caused to deliver heat to the fluids under control. This heat is preferably produced by a supply of electric energy to an electrical resistance element. The flow of current through the element during the particular thermal relationship between the fluid and the element is used to govern the rate at which the feed fluid is supplied.

The object of my invention is to provide a method of controlling the admission of fluids into conduits which is accurate in regard to its function of relating the flow within the conduit to other conditions within the conduit.

It is also the object of my invention to establish and maintain certain thermal and flow relationships between fluids in different conduits through regulation of the means for forcing these fluids into the conduits.

It is furthermore the object of my invention to provide a mechanism which by its mode of action can be made to control the flow of feed fluids in any relative differential degree of response to physical, thermal, and kinetic states of the fluids in their containers.

It is the object of my invention to provide a simple, compact, reliable, and accurate device for controlling the rate of supply of fluids to their containers in relation to their physical state, rate of flow, pressure, and temperature at any number of points in their containers.

It is specifically the aim of my invention to supply a satisfactory means for controlling forced circulation boilers, condensers, regenerative powerplant feed heaters, and for coordinating generators of different working fluids in binary or multicycle powerplants.

In Figure 1 I have shown a diagrammatical representation of my control system. Figure 2 represents a diagrammatical section of another form of the electrical resistance element used in my control. Figure 3 shows a section of another preferred form of resistance element. Figure 4 represents a section of a modified form of this resistance element. Figure 5 shows a further modified form of the resistance element. Figure 6 represents a vertical section of a preferred form, and Figure 7 a plan section of the element. Figure 8 shows a section through a resistance element of my control system for regulation of the relative flow of three fluids. Figure 9 represents a plan section of Figure 8. Figure 10 illustrates in section an electrical control valve for feed water flow which may be used in conjunction with the system of my invention. Figure 11 shows a specimen environment for the control system of my invention in a steam power plant. Figure 12 shows a section of an electrically controlled air damper. Figure 13 represents a section of a fuel control nozzle. Figure 14 shows diagrammatically a utilization of the method of my invention as an indicator for conditions in a container.

In Figure 1 is illustrated one preferred embodiment of my invention. In this example an electrical resistance plug 130 comprises a body 100 screwed into a conduit 117 for a fluid, an electrical insulator 101 clamped into the body, an electric binding post 102 projecting through and retained by the insulator, and a metallic wire electrical resistance element 103 immersed in the fluid in the conduit. The element provides an electrical path for grounding out current from the binding post.

An inlet 116 for feed fluid being forced into the conduit 117 is fitted with a flow control valve 52 to vary the flow of the feed fluid.

An electrical solenoid 107 operates the flow control valve 52 in accordance with the current passing through it along a lead 108 from a grounded storage battery 104 or other source of electrical energy such as a generator. The current which is grounded in the element 103 by way of a lead 109 and the binding post 102 actuates the electrical solenoid 107.

Current passing through the electrical element 103 liberates heat approximately in accordance with the square of the current and the first power of the resistance of the element. This heat is imparted to the fluid adjacent to the electrical resistance element. The resistance of the element 103 varies in relation to the temperature which the element has assumed.

In Figure 10 is illustrated in a larger scale section the flow control valve 52 and the solenoid 107 which I prefer to use for the regulation of the flow of liquids, particularly feed water. This valve comprises a body 105 in circuit with the tube 117 through which the liquid to be controlled flows. A valve seat 143 and a cylindrical valve 140 are placed in the main line of flow of the inlet liquid and are capable of shutting down the flow to any predetermined degree in accordance with the position of the valve 140. This valve is closely fitted for axial movement in a hollow cap 125 which forms a chamber 126 above the end of the valve 140. An orifice 127 connects the chamber 126 with a chamber 128. A duct 115 from chamber 128 to the inlet 116 is regulated in opening by a stem 112. This stem is formed as a projection on an iron plunger 113 and may be caused to uncover the duct 115 by the electro-magnetic action in a solenoid core 134 or may be returned to its seat forcibly by a coil spring 133. A solenoid coil 114 in a casing 120 magnetizes the core 134 when energized with current. Terminals 118 and 119 are provided for connection to the solenoid coil.

The action of this electric control valve is as follows: When the solenoid has become sufficiently energized with current the spring 133 is compressed, thereby causing the stem 112 to rise off the duct 115. The chambers 128 and 126 then assume the same pressure existing in the inlet 116. Since the fluid in the inlet 116 is at a slightly higher pressure than that in the tube 117, the valve 140 drops to the seat 143 cutting off the flow. The cross-sectional area of the valve on seat 143 is less than that enclosed in the cap 125, therefore the valve 140 remains tightly seated.

A reduction of current flow in the solenoid 107 causes the seating of the stem 112 on the duct 115. The pressure in the tube 117 is thereby wholly or partly restored to the chamber 128 and the chamber 126. The pressure in the inlet 116 acts upon the valve 140 to wholly or partly open it.

Factors upon which the temperature of the element 103 in Fig. 1 depends are: the conductivity of the fluid to heat transmission, the specific heat and heat of change of state which may be imparted to the fluid to produce a resultant temperature rise and change of state in the fluid, the speed with which the fluid passes the element thereby carrying heat away from it, and the temperature of the fluid adjacent to it in the conduit.

At common rates of flow convection heat is carried away from the electrical element by moving water in a conduit as a function of about the .8 power of the velocity. This function is in accordance with findings of investigators into the heat transfer with the turbulent flow of water through pipes.

The heat conductivity of most fluids is far greater in the liquid state than in the gaseous state.

The specific heat of most fluids is greater in the liquid state than in the gaseous state, and decreases with increase of temperature.

In causing liquid to change to vapor of that liquid at sub-critical pressure, a heat of vaporization must be added although the temperature of both fluids may remain the same during the process.

During thermal decomposition or chemical change in a fluid, heat may be either absorbed or liberated by the fluid. In one use of the control shown in Figure 1, a feed fluid of constant temperature and of unchanging state is forced into the inlet 116 and caused to flow along the conduit 117 past the element 103 which is receiving current through the electrical mechanism 107. The delivery of a constant rate of supply of feed liquid from a centrifugal pump to the inlet of a series tube boiler operated at a predetermined constant output, constitutes such an application. A change of rate of flow of the conduit fluid will produce a change in the rate at which heat is being carried away from the element. This results in a variation of the temperature of the element, a consequent change of its resistance to electrical flow, a decrease or increase of the amount of current being grounded out through the element, and a subsequent readjustment in the flow control valve 52 to counteract the above mentioned changes and to restore the fluid passing the resistance element to its original rate of flow. Therefore this particular application of my invention may serve to maintain constancy of the rate of flow of fluid through the conduit.

If now, the temperature of the feed fluid entering the inlet 116 will be varied before reaching the resistance element 103, the heat transmission from the element to the fluid is altered thereby, so that a new type of regulation of the flow control valve 52 results. This temperature variation acts upon the element to either increase or decrease the flow of feed liquid in order to maintain approximately a desired fluid temperature at the region of thermal contact between the resistance element and the conduit fluid.

In another case, if a feed fluid which undergoes thermal decomposition or change of state while passing through the conduit will be introduced into the inlet 116, a location of the resistance element 103 at or adjacent to the critical region of change permits the element to be sensible to the degree of change which has taken place at that zone. This sensibility is a result of the change of heat transfer rate from the element to the fluid when the change of state takes place and may be used in its action upon the control valve 52 to approximately hold the region of change to a certain desired point in the conduit.

When the thermal qualities of the fluid in the conduit vary greatly as a result of transition of the fluid therein from one state to another, the effect of temperature or rate of flow of the fluid passing the resistance element may become comparatively negligible.

The manner in which the resistance element 103 protrudes into the conduit fluid or is recessed away from it also determines the relative extent of effect of the aforementioned factors upon the element 103.

A further point to be mentioned regarding the mode of operation of the device of my invention as revealed in Figure 1 is that since any desired amount of heat may be produced in the resistance element according to its size, resistance, and impressed voltage, the electrical element itself may be used to produce a localized change of state in the conduit fluid adjacent to it. The resistance element then indirectly reacts to the amount of heat which must be added to the fluid at that region of the conduit in order to accomplish this change of state, and may be utilized in flow control to keep the conduit fluid as a whole within a certain range from that particular change of state.

In Figure 2 is shown a modification of the resistance element of my control system, having sensibility to the same fluid qualities which have been mentioned in the description of the device as illustrated in Figure 1, but producing a somewhat different effect upon an electrical circuit, as changes occur in the fluid surrounding it.

A body 120 screwed into the conduit 117 encloses an insulator 121 which retains a binding post 122 terminating in an electrode 123. The electrode 123 projects into the interior of a metal capsule 124 welded or otherwise hermetically sealed to the body 120. The capsule contains an appropriate fluid such as mercury which may be caused to change state and electrical resistance properties due to imposed thermal conditions.

Fluid change of state from a liquid to a vapor, or vice versa, at a certain temperature within the capsule, makes possible an abrupt and critical change in the conductivity between the electrode and the capsule even though adjacent fluid conditions in the conduit have varied to a relatively small extent.

In Figure 3 I have illustrated a further modification of the resistance element of my control system. This device retains the sensibilities ascribed to the element shown in Figure 1, and in addition is directly responsive to the conduit fluid pressure adjacent to it. This further modification of my invention may be used to regulate the flow of feed fluid as a direct function of and to any desired degree of differential effect of each of the fluid qualities mentioned so far.

A body 110 mounted in the conduit 117 encloses an insulator 111 which retains a binding post 112 connected to a preferably laminar electrical resistance element 113 of carbon. An elastic metal capsule 114 sealed to the body 110 houses the resistance element and acts as an electrical ground. Deformation of the elastic capsule by fluid pressure in the conduit is physically resisted by the element 113. The opposing pressure within the element 113 causes change of its electrical resistance. Likewise the thermal effect of a fluid adjacent to the element 113 further varies its electrical resistance. The effect upon the amount of current being grounded out in the element by its change in resistance may be used to maintain any desired relative fluid conditions in the conduit adjacent to the device of my invention.

In Figure 4 another preferred embodiment of the resistance element is presented. A body 190 attached to the conduit 117 retains a binding post 191 and a metal bellows 195 in an electrical insulator 192. The bellows extend into the fluid in conduit 117 and contains a compressible electrically resistant fluid, preferably mercury vapor. Compression of the bellows by the fluid in the conduit 117 causes a contact 194 on the inner surface of the bellows to approach or meet a contact 193 on the end of the binding post 191. In order that current passing through the electrical mechanism 107 may reach the ground it must first flow along the lead 109 into the binding post 191 through the fluid in the bellows, or through the contacts 193 and 194, to the bellows, and thence through the fluid in the conduit 117 to the walls of the conduit 117.

This modified device retains the sensitivities ascribed to the device illustrated in Figure 3 and in addition is directly responsive to the electrical conductivity of the conduit fluid adjacent to it.

Furthermore this device shown in Figure 4 contains within its capsule a sealed fluid which, due to thermal conditions, may vary its pressure, expanding or contracting the bellows and so changing the distance between the contacts 193 and 194.

A still further modified form of the resistance element of my invention is illustrated in Figure 5. It comprises a body 250 screwed into the conduit 117, said body enclosing an electrical insulator 251 which surrounds a binding post 252, one end of which terminates in a bimetallic element 253 and electrical contact 254. Sealed to the body is an elastic metal capsule 256 with a contact 255 on its inner surface opposite the contact 254. Within the capsule is an elastic fluid, such as mercury vapor, of electrical resistive properties varying with change of its temperature.

Increase in pressure of the conduit fluid causes contacts 254 and 255 to approach or meet each other due to deflection of the capsule and so increases the amount of current which may be grounded out in this element.

Variation of temperature within the capsule changes the electrical resistance of the fluid contained therein with a resultant effect upon the flow of current between the contacts provided they are separated.

A second effect of variation of temperature within the capsule is the flexure of the bimetallic element 253 holding the contact 254. This flexure is a result of the differential thermal expansion or contraction of the dissimilar metals composing the element 253, and by adjusting the distance between the contacts produces an effect upon the flow of current from the lead 109 to the ground.

A third effect of variation of temperature in the capsule is the change of pressure of the fluid in the capsule in relation to the conduit fluid pressure. This in turn varies the distance between the contacts 254 and 255 by expanding or contracting the bellows, and produces a change in the current flowing between the contacts.

In Figure 6 is shown another modification of the resistance element of my control in side elevation. In Figure 7 is illustrated a plan view of the same device in section.

The device comprises a body 260 attached to the conduit 117, an electrical insulator 261 clamped into the body, an electrical binding post 262 retained by the insulator, and a paddle-like extension 263 of the binding post, surrounded by preferably granular resistance material 265 such as carbon contained in a flattened metallic capsule 264. The capsule is hermetically sealed to the body 260.

The granular resistance material is varied in its electrical resistance by thermal effects and also by pressure imposed upon it. Fluid pressure within the conduit 117 tends to flatten the metal capsule and so compress the resistance material.

Electric current is grounded out in the metal capsule 264 after having entered the binding post and having passed through the resistance material.

In Figure 8 I have shown a modified form of the resistance element of my control, sensitive to three different fluids. A body 160 is sealed to a metallic elastic capsule 162 enclosing an electrical resistance fluid. Some contacts 163 and 164 are provided between the elastic metal capsule and a binding post 165. An electrical insulator 166 fixes the binding post within the body.

A tube 167 containing a first fluid such as steam, another tube 168 containing a second fluid such as feed water, and fins 169 thermally related to the conditions of a third fluid such as flue gas surrounding the two aforementioned tubes and the device, are in thermal contact with the chamber 161 into which the resistance element is projected. The fluid within the chamber 161 is that of the tube 167, since a duct 170 provides communication to the interior of the tube 167.

The resistance element as utilized in Figure 8 is responsive to the first fluid pressure in the tube 167 and is responsive to the thermal conditions and relative rates of flow of the first, second, and third fluids. The device may be used to regulate the flow of any or all of the three fluids to establish and maintain related thermal conditions or rates of flow between them in a manner which will be described later in this specification in the steam powerplant shown in Figure 11. Electric current grounded out between the contacts 163 and 164 if they are touching each other, or grounded out in passing through the fluid between the contacts if they are separated, is used to operate appropriate mechanisms, preferably those disclosed in Figures 10, 12 and 13, for controlling the relative flow of the fluids. The distance between the contacts 163 and 164 depends upon the deflection of the elastic metal capsule 162. A high pressure in the tube 167 will tend to reduce the distance between the contacts, or to make them touch. This results in an abrupt increase of conductivity of the device.

A high temperature of the fluid such as mercury vapor within the capsule will tend to force the contacts apart through the expansion of the fluid within the capsule. The electrical conductivity between the contacts varies in accordance with the temperature, pressure and physical state of the fluid in the capsule.

In Figure 9 is shown a plan section of Figure 8.

I do not limit myself to the form of the electrical element of my control as illustrated in Figures 1, 2, 3, 4, 5, 6, 7, 8, and 9 to provide a new and useful method of control of fluids in conduits.

In Figure 11 is shown diagrammatically a steam power plant utilizing the control of my invention.

The boiler comprises a boiler casing 39 enclosing an economizer section 22, an evaporation zone 23, and a super-heater 24. The feed liquid is supplied from a tank 51 through a conduit 14 to a centrifugal feed water pump 15 which delivers water under pressure to the economizer inlet check valve 18. A flow control valve 52 (shown in larger scale in Figure 10) is placed between the economizer 22 and the evaporation zone 23. After passing the check valve the feed water enters the boiler at region 19 and is brought into thermal contact with the resistance element 53 (illustrated in section on a larger scale in Figures 8 and 9) at the tube 168. The feed water is then conducted through a tube 20 to an economizer inlet 21. The feed liquid progresses through the economizer 22, the flow control valve 52, the boiler evaporation zone 23, and the superheater 24, changing in state and again coming into thermal contact with the resistance element 53 at the tube 167.

The steam formed then continues through the superheater to a boiler outlet 25. A form of thermal resistance element 54 of my control is located in the boiler outlet and shown diagrammatically on a larger scale in Figure 2. The outlet steam flows through a tube 26 to a main drive turbine 1. Power is delivered from the turbine 1 through a propeller shaft 5. The expanded steam exhausted from the turbine emerges at a duct 4 and is conducted along a pipe 9 to an exhaust turbine 6, and is finally discharged from an exhaust 8. The power output of the exhaust turbine is transmitted along a shaft 13 for the operation of the feed water pump 15, along a shaft 12 for the rotation of a centrifugal air-blower 30, along a shaft 11 for the actuation of a centrifugal fuel pump 29, and along a shaft 10 for the rotation of a constant voltage electric generator 27. The air supply for the blower 30 enters an inlet 31 and is discharged past a damper 57 (which is also illustrated on a larger scale in Figure 12) into a draft duct 32 leading into a collection chamber 33. The air passes through tangential louvres 69 in a conical plate 34 to a boiler combustion chamber 35. The combustion gases sweep the boiler tube in a space 36 and are finally discharged from a flue 37. A resistance element 67 (illustrated in larger scale in Figure 1) is placed in thermal relationship with the air in the blower inlet 31.

Fuel from a storage tank 68 is admitted to the fuel pump 29 along an inlet duct 28 and discharged along conduit 63 past a resistance element 70 (illustrated in larger scale in Figure 1) and along conduit 64 to the fuel control solenoids 179. This fuel nozzle assembly is illustrated in section on a larger scale in Figure 13.

The electrical system comprises the following: The electric generator 27 is grounded on a lead 40 and delivers current along a lead 41 to a bar 44. A switch 42 may be thrown to the bar 44 to cause connection with a lead 45 to a storage battery 46 which is grounded by a lead 47. A switch 82 may be brought into engagement with the bar 44 to energize a lead 48 from which current is conducted along a lead 89 to a terminal 311 in a damper contact box 2. This current emerges from a terminal 310 and passes along a lead 90, branching along a lead 61 to a terminal 187 of the electric control solenoids 179 of the fuel nozzle, and branching along a lead 91 to a primary coil 55 of a spark coil 56. This latter current is grounded out in a lead 92. High tension electricity is induced in a secondary coil 93 and is conducted along a lead 59 to a sparking plug 58 located in the combustion chamber 35 for the ignition of the fuel spray.

The portion of the current which has entered the terminal 187 in the solenoid 179 emerges in part from a terminal 186 to be carried along a lead 66 and grounded out in the resistance element 67, and also emerges in part from a terminal 185 to be conducted along a lead 65 to the resistance element 70 in the fuel line.

In the electrical system controlling the air supply to the boiler, current is carried along the lead 48 to a terminal 301, where it is used to actuate a damper solenoid 397. The current then enters a lead 62 from a terminal 302 and is grounded in the electrical resistance element 54.

In the electrical system controlling the economizer water current flows from the lead 48 along a lead 49 to the terminal 119 through the solenoid 107 and out the terminal 118. It then travels along lead 60 to be grounded out in the resistance element 53. If the thermal effect of the feed water in the region 168 and the thermal and pressure effect of the steam in the region 167 act upon the electrical resistance 53 to allow a high current to flow in the circuit just described, then the flow of economizer water in the boiler will be shut off or reduced. However, if the resistance of the electrical element in the device 53 is high, then the economizer water control valve 52 will be opened due to the spring 133 overcoming the electro-magnetic force of the solenoid 107.

Accordingly an appropriate balance of boiler conditions will be established in relation to the discharge from the feed water pump 15, and the discharge of steam from the boiler outlet 25.

In Figure 13 is shown diagrammatically a large scale cross-sectional drawing of the electric fuel nozzle control solenoid 179.

The nozzle assembly comprises a fuel inlet 181, a casing 184 subject to fuel pressure within, a spring 38 acting from the underside of the casing downward upon a plate 34 which holds the conical combustion plate 34 into position. Within the casing 184 is a solenoid coil 190 connected to the terminals 187 and 186, and also the solenoid 191 connected to the terminals 186 and 185. The solenoids 190 and 191 are coaxial and surround an iron plunger 192 which is shorter than the total axial length of the two solenoid coils. A stem 182 projects from the core 192 and forms a pintle-type nozzle with a seat 183.

When the stem is seated and the nozzle closed, the magnetic center of the plunger 192 is nearer the magnetic center of solenoid coil 191. When the stem 182 is fully raised off the seat 183 the plunger 192 exists at a point nearer the magnetic center of the solenoid 190.

The regulation of the fuel system now is as follows: If the flow from the centrifugal fuel pump 29 exceeds that which is required from the centrifugal airblower 30, then the amount of current being grounded out in the electrical resistance device 70 will be proportionately larger than the amount being grounded out in the electrical resistance device 67. This causes a stronger magnetic attraction in the electrical solenoid 191 than in the solenoid 190. According, the magnetic center of the plunger 192 is drawn away from the magnetic center of the solenoid 190 and toward that of the solenoid 191, tending to close off the space for injection between the stem 182 and the seat 183.

If on the other hand, the flow of fuel through the fuel conduit 64 is less than the amount of air flowing through the draft duct 32 for the fulfillment of a proper air-to-fuel ratio, then the magnetic center of plunger 192 will be drawn upward toward the magnetic center of the solenoid 190 and away from that of the solenoid 191. This causes an opening of the space between the stem 182 and the seat 183.

In this manner the electrical resistance elements 70 and 67 cause a relative flow of current in the electric solenoids 190 and 191 which will establish the desired air-to-fuel ratio.

In Figure 12 is shown a diagrammatic section of the damper assembly 399 on a larger scale. A piston valve 319 is adapted to slide along a spindle 317 blocking off or giving any desired degree of opening to the blower outlet 398. A spring 315 tends to keep the valve 319 in closed position through reaction on shoulder 316. A chamber 313 is under an air pressure equal to that of the blower discharge pressure when an orifice 307 is kept closed by a disc 396. However, when the disc 396 has been forced off the orifice 307 by the electro-magnetic action of the solenoid 397 upon a plunger 304, then air from the space 313 is allowed to escape through the orifice 307 and an orifice 305 in the solenoid casing 33. This causes an unbalanced pressure to act upon the piston 319, compressing the spring 315 and opening the blower outlet 398. The solenoid 395 is connected to the terminals 301 and 302. In the end of the chamber 397 is a contact box 2 comprising a contact 394 mounted upon the terminal 311 through a leaf spring 393. An electrically insulated projection 322 of the disc 396 strikes the spring 393 and causes the contact 394 to strike the contact 391 on the terminal 310 when the plunger 304 has been forced electro-magnetically to raise the disc 396 off the orifice 307.

Accordingly, if the solenoid 397 has become electrically actuated to open the outlet 398 of the blower 30, then the circuit between the terminals 310 and 311 becomes closed allowing the fuel flow to commence, and the ignition current to be established for the ignition of the fuel.

Other functional details of the steam power plant shown in Figure 11 are as follows: The switch 42 may be closed upon bar 44 allowing current to flow from battery 46 along lead 45 and lead 41 to the electric generator 27, and after passing therethrough to be grounded out in the lead 40. This causes the fuel pump 29, the airblower 30, and the water pump 15 to pump their respective fluids centrifugally. The switch 82 is then closed upon bar 44 and current is caused to flow also along lead 48 to contact 301 in the damper solenoid 397 and out the terminal 302 along the lead 62 to be grounded out in the electrical resistance element 54. This element 54 allows a large amount of current sufficient to open the damper, to be grounded out when its temperature is low in value and a small amount of current incapable of holding the damper open when its temperature is beyond a predetermined value. The element 54 is therefore thermally responsive to conditions in the outlet 25 for a control of the opening and closing of the damper.

In Figure 14 is illustrated diagrammatically a utilization of the device of my invention as a meter for fluid in a container 1.

The electrical circuit includes a storage battery 8 or other appropriate means for electrical supply of constant voltage, an electric switch 6 connected thereto by a lead 7, and an electrical resistance element 2 connected to the switch by a lead 5. The electrical circuit is completed by an ammeter 10 connected to the battery by a lead 9, and to the electrical resistance element by a lead 11.

The electrical resistance element 2 is retained in a body 3 by an insulator 4. The body is attached to the container 1 so that the electrical resistance element 2 is immersed in the container fluid.

When the electric switch 6 is closed, current of the amount indicated in the ammeter 10 flows through the element 2 heating the element and causing it to contribute heat to the container fluid. The ability of the container fluid to absorb this heat determines the temperature which the element 2 assumes.

The flow of current, which is indicated in the ammeter, is dependent upon the magnitude of the electrical resistance of the element 10, and this resistance is in turn dependent upon the temperature which the element has assumed.

The ability of the container fluid to absorb heat from the element 10 is a function of the condition of the fluid. Such condition of the fluid may include among other factors, change of rate of flow, quantity storage, temperature, specific heat, latent heat, thermal conductivity, permeability to radiation, or length of time during which the fluid in the container has been supplied with heat from the element 10.

The ammeter 10, therefore, represents a device which is responsive in a pre-determined way to any one or to a combination of several of the mentioned factors, its response being useful solely as a visual indication or as a controlling factor for regulating instrumentalities. Under most conditions the resistance element 2 is arranged to be exothermic, that is, to give off heat to its surroundings, but under some conditions this predetermined portion 2 of the electric circuit can be endothermic, that is to absorb heat from its surroundings, all for the purpose of producing an electrical variation in the circuit bearing some definite relationship to a selected condition affecting caloric dissemination.

I claim:

1. A control system comprising a container, means for supplying feed liquid to the inlet of said container, an electrical resistance element thermally associated with the fluid inside of said container, means for supplying said element with electrical current, to elevate the temperature of said element substantially above that of said fluid to produce heat of electrical resistance to be extracted from said element by said fluid, characteristic variation of the electrical resistance of said element in accordance with the rate of extraction of said heat by said fluid, and means for controlling said feed supplying means in accordance with the current flowing through said element.

2. A flow control device comprising a first fluid flowing in a first conduit, a second fluid flowing in a second conduit, a first electrical resistance element in heat contributing relationship to said first fluid, and varied in electrical resistance in relation to the rate of heat contribution to said first fluid, a second electrical resistance element in heat contributing relationship to said second fluid, and varied in electrical resistance in relation to the rate of heat contribution to said second fluid, and means controlled by the flow of current through said first and second electrical resistance elements for regulating the relative rates of flow of said first fluid and said second fluid.

3. A control device comprising a container for fluid, having a first temperature range, a capsule thermally related to the fluid in said container at a second temperature range, an electrical resistance element in said capsule the physical state and in consequence the electrical resistance of said element changing abruptly under conditions imposed upon it by said fluid, means for supplying electrical current to said resistance element, to produce a temperature differential between said fluid and said element, means for varying fluid conditions in said container, and means for regulating said varying means in accordance with the flow of current through said element.

4. A control comprising a first conduit for a working vapor and means for controlling flow therein, a second conduit for fuel for the formation of said working vapor and means for controlling the flow therein, a third conduit for air for combustion of said fuel and means for controlling flow therein, some electrical resistance elements responsive to heat absorbing conditions in said conduits, and at temperature levels substantially higher than the temperature levels of the fluids in said conduits, means for supplying current to said elements, thereby maintaining said higher temperature levels by addition of heat of electrical resistance and means responsive to the flow of current through said elements for regulating said flow controlling means.

5. A control comprising a container for a fluid, an electrical resistance element at a temperature substantially different from that of said fluid adjacent thereto and responsive to conditions in said container, characteristic variation of temperature difference between said fluid and said element by conditions of said fluid extraneous of the temperature of said fluid, an electric circuit for supplying current to said element, and means subject to electrical induction effects in said circuit for controlling conditions in said container.

6. A control comprising a tube for air, a conduit for fuel for burning with said air, some elements being heated by resistance to flow of current and delivering heat to said tube and said conduit, at rates dependent upon the respective mass flows in said tube and said conduit, means for supplying said current to said elements, at a substantially constant potential and means for controlling the relative flow of the fluids in said tube and said conduit in accordance with the relative amount of current flowing in said elements.

7. A control comprising a tube containing a relatively cool fluid, means for regulating flow in said tube, a relatively hot body thermally related to said fluid and being supplied energy from a flowing current, means for controlling said means for regulating flow in accordance with the thermal conditions in said body affecting the receptivity of said body to said energy.

8. A control system comprising a container, means for causing flow of fluid in said container, an electrical resistance element in heat delivering relationship to the fluid inside of said container, means for supplying said element with electrical current, and means for controlling said means for causing flow in accordance with said current varied in proportion to said delivering relationship.

9. A control comprising a container, an electric circuit, a source of electromotive force in said circuit, a conductor at a relatively high temperature in said circuit and in exothermic relationship with some contents at a relatively low temperature of said container, separate means for bringing about thermal changes in said container and means in said circuit responsive to electrical fluctuations produced by the degree of difference between said high temperature and said low temperature for controlling said separate means.

10. A control system comprising a thermal and pressure responsive electrical resistance element in a container, for controlling a supply of feed fluid to said container in accordance with the variation of electrical qualities of said element.

11. A control system comprising a resistance for heat contribution to a coolant, a displacer for producing relative motion between said resistance and said coolant, means for supplying electrical power to said resistance at a substantially constant potential, said resistance further characterized by ability to absorb said power at a rate dependent upon the heat absorption therefrom by said coolant, and means for controlling said displacer in accordance with said rate.

12. A control system comprising a fluid flow system with supply instrumentalities for maintaining desired conditions therein, a critical zone at a relatively low temperature level in said flow system, a vaporimeter supplied heat by electrical resistance and located in said critical zone, said vaporimeter operated in a relatively high temperature range, and means sensitive to the temperature level of said vaporimeter for regulating said instrumentalities.

13. A control system comprising apparatus for comparing relative heat absorbing capabilities of a plurality of fluid flow systems by delivering heat to said flow systems through an electrical resistance in each, means for connecting the resistances to an electric supply, and means for relatively controlling said flow systems in accordance with the relative flow of current in said resistances.

14. A control system comprising a fluid flow system, an energized electrical circuit of a control motor for supply instrumentalities of said flow system, said circuit connected to a conductor thermally related to a portion of said flow system, and a substantial temperature gap between said conductor and said portion, said gap varying in magnitude in accordance with fluid conditions in said portion.

15. A control system comprising a fluid system to be conditioned, an electrical control motor for means for conditioning said fluid system, an electrical conductor thermally related to said fluid system, means for supplying said motor and said conductor with a current thereby relating said motor to said conductor and producing a temperature gap between said conductor and said fluid system, said gap varying in accordance with the pressure in said fluid system.

16. A control system for a fluid flow course comprising a conduit, pumping means for driving fluid through said conduit, a capsule in said conduit and containing an electrical conducting material, said capsule subject to deflection thereby causing said conducting material to be subject to variable compression in accordance with fluid pressure in said conduit, means for causing said material to be thermally responsive to conditions in said conduit, means for supplying said material with current, and means for regulating said pumping means by said current.

17. In combination an electrical conductor heated by passage of electrical current and varied in conductance in accordance with the temperature produced therein, means for thermally relating said conductor to an intermediate region in a serial fluid flow system such that during a first fluid flow criterion in said region a first temperature and a first rate of said passage of current ensue in said conductor, said means further relating said conductor to said region such that during a second fluid flow criterion in said region a second temperature and a second rate of said passage of current result in said conductor, and means for controlling a supply instrumentality of said fluid flow system in accordance with the rate of said passage of current to affect said criterion in said region.

NATHAN C. PRICE.